United States Patent [19]
Huckabay

[11] 4,160,815
[45] Jul. 10, 1979

[54] ALUMINUM SULFATE MANUFACTURING PROCESS

[75] Inventor: Durward A. Huckabay, Walnut Creek, Calif.

[73] Assignee: Imperial West Chemical Company, Antioch, Calif.

[21] Appl. No.: 775,954

[22] Filed: Mar. 9, 1977

Related U.S. Application Data

[63] Continuation of Ser. No. 609,248, Sep. 2, 1975, abandoned.

[51] Int. Cl.² .............................................. C01F 7/74
[52] U.S. Cl. .................................... 423/556; 423/128
[58] Field of Search ........................ 423/128, 132, 556

[56] References Cited

U.S. PATENT DOCUMENTS

| 1,962,498 | 1/1930 | Fross | 423/128 |
| 3,079,228 | 2/1963 | Skay | 423/132 |
| 3,226,188 | 12/1965 | Ruter et al. | 423/556 |
| 3,286,992 | 11/1965 | Armewiades et al. | 260/2.5 BC |
| 3,667,905 | 6/1972 | Hennings | 425/556 |

FOREIGN PATENT DOCUMENTS

| 2485955 | 6/1975 | Fed. Rep. of Germany | 423/556 |
| 37-952 | 4/1962 | Japan | 423/556 |
| 223077 | 6/1967 | U.S.S.R. | 423/128 |

Primary Examiner—O. R. Vertiz
Assistant Examiner—Gary P. Straub
Attorney, Agent, or Firm—Fulwider, Patton, Rieber, Lee & Utecht

[57] ABSTRACT

There is disclosed a continuous process for the manufacture of aluminum sulfate by the reaction of sulfuric acid with an alumina-containing solid in an aqueous suspension. The reaction stream is passed into a continuous flow reaction zone that is maintained at a temperature controlled from 225° to 260° F. and under superatmospheric pressure, preferably, autogenic pressure. The reactants are passed through the reaction zone with a residence time of from 5 to about 45 minutes, sufficient to achieve from 78% to 100% completion of the reaction. An intimate admixture of the reactants is achieved by blending the reactants in a mixing zone wherein the combined streams are diverted into helical flow with repeated reversal in the direction of rotation of the helical flow during passage through the mixing zone.

4 Claims, 2 Drawing Figures

ALUMINUM SULFATE MANUFACTURING PROCESS

REFERENCE TO RELATED APPLICATIONS

This application is a continuation of my copending application, Ser. No. 609,248, filed on Sept. 2, 1975, now abandoned.

BACKGROUND OF THE INVENTION

1. Field of the Invention

This invention relates to a method for the manufacture of aluminum sulfate and, in particular, to a continuous process for the manufacture of aluminum sulfate from alumina-containing solids and sulfuric acid.

2. Description of the Prior Art

The production of aluminum sulfate from alumina-containing solids by reaction with sulfuric acid has been characterized by discontinuous, batch processing involving long residence times in autoclaves, reaction vessels and the like. Normally, the reaction has been conducted at atmospheric pressures, however, a batch process performed at superatmospheric pressures is disclosed in U.S. Pat. No. 1,679,366. Some attempts at continuous processing have involved relatively complex processing schemes employing multiple reaction zones or stages such as disclosed in U.S. Pat. Nos. 3,079,228; 3,143,392; 2,273,930; 3,185,545; or 3,216,792. In most of these processes there are incremental additions of sulfuric acid and/or alumina during the staged processing to achieve substantially complete reaction and to provide a close control over the sulfuric acid to alumina ratios. All of these reactions, however, have required relatively lengthy reaction periods and extensive processing equipment.

BRIEF STATEMENT OF THE INVENTION

This invention comprises a continuous process for the manufacture of aluminum sulfate by the reaction of sulfuric acid with alumina-containing solid in an aqueous suspension. The reaction is performed by bringing together, in a reaction zone, water, sulfuric acid and an alumina-containing solid. While these can be independently added to the reaction zone, it is preferred to employ a mixing sequence which permits facile control and the most efficient thermal balance of the process. Preferably, the alumina-containing solid is suspended in water to form a slurry which is introduced into a mixing zone where it is contacted with sulfuric acid. The alumina-containing solid and sulfuric acid are admixed in substantially stoichiometric proportions, e.g., from 80–120 percent of the theoretical amounts for the reaction. The amount of water used is sufficient to provide a sulfuric acid concentration in the reaction zone from 30 to about 60 weight percent. The sulfuric acid is of sufficient concentration to achieve a desirable exothermic heat of solution for preheating the reactants and is introduced into the interior of the stream of the alumina slurry using a coaxial introduction nozzle. The blended streams are then passed through a mixing zone where they are intimately admixed by helical flow with multiple and repeated changes in the direction of rotation of the helical flow. The reactants are preheated to the incipient reaction temperature, at least about 150° F., by the exothermic heat of solution of the sulfuric acid and/or alumina suspension reactant streams and any supplemental heating that may be necessary. The reaction mixture, at the incipient reaction temperature, is then passed into a continuous flow reaction zone which is maintained at a temperature from 225° to 260° F. by cooling with indirect heat exchange. The pressure of the reaction zone is maintained at sufficient superatmospheric pressure of the reactants to permit achieving the aforesaid temperature. The reactants are passed through the reaction zone at a rate sufficient to provide a residence time therein from 5 to about 45 minutes, sufficient to achieve from 78 to about 100 percent completion in the reaction. The crude reaction product is withdrawn from the reaction zone, diluted, cooled and subjected to density separation to recover unreacted alumina and more dense, inert solids. The unreacted alumina can be recycled. The separated reaction product is diluted to prepare an aqueous solution of aluminum sulfate of the desired concentration.

BRIEF DESCRIPTION OF THE DRAWINGS

The invention will be described with reference to the drawings of which.

DESCRIPTION OF THE PREFERRED EMBODIMENT

Figure 1:
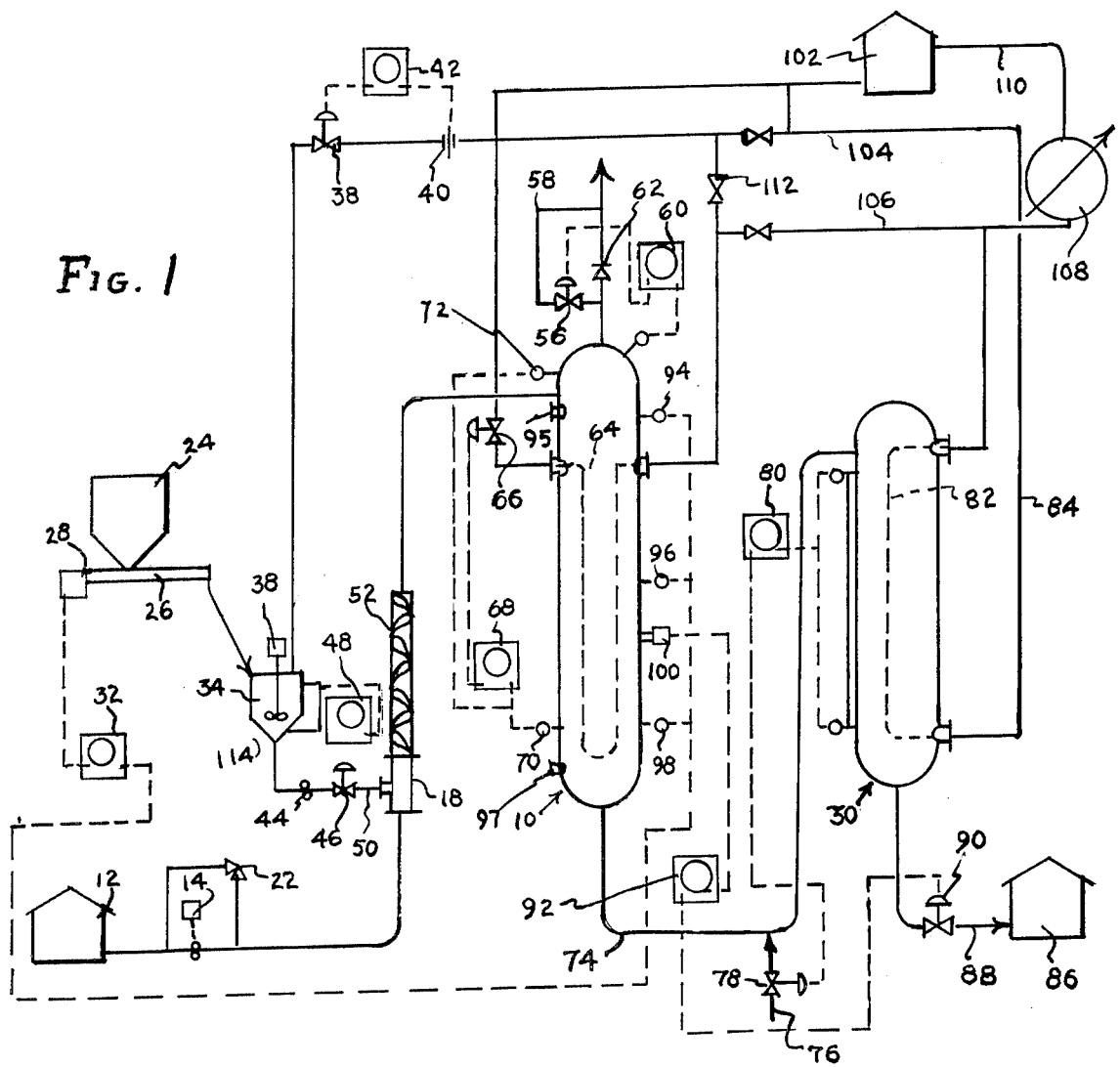
FIG. 1 is a process schematic of the invention.

Referring now to FIG. 1, there is illustrated a schematic of the preferred embodiment of the process of the invention. The reaction is conducted in reaction vessel 10 which is supplied with thoroughly blended and admixed reactants from tubular mixer 20 and from which products are withdrawn and passed to the product cooler, vessel 30.

The sulfuric acid for the process is stored in vessel 12 and is withdrawn through a positive displacement metering pump 14 at a predetermined, constant flow rate. The acid is passed through line 16 to the central tube 18 of tubular mixer 20. In the event of a flow blockage in line 16, a relief valve 22 is provided to bypass acid about pump 14.

The alumina-contacting solid is stored in a finely subdivided condition in solids hopper 24 and is withdrawn therefrom by a continuous screw conveyor 26 driven by motor 28 that is on a speed control in response to a conductivity indicator and controller meter 32. The alumina-containing solid can also be prepared by wet grinding, e.g., by ball milling in an aqueous slurry. The resultant slurry can then be supplied to tank 34 or directly to mixer 20. The conveyed solids are discharged into a tank 34 where the solids are suspended in water supplied to the tank through line 36 under agitation by propeller mixer 38. The water is supplied to the tank 34 at a constant flow rate by control valve 38 in response to the metered flow rate through flow meter 40 and under control of signals from flow indicator controller 42.

The suspension of alumina-containing solids in water is withdrawn from vessel 34 by pump 44 at a constant flow rate controlled by valve 46 which responds to level indicator controller 48 to maintain a constant level of suspension in tank 34. The aqueous suspension of alumina-containing solids is discharged through line 50 into the outer tube of the tubular mixer 20 to provide an annular, coaxial flowing stream of slurry about the acid inlet tube 18. The blended streams of acid and alumina-containing slurry are passed into the mixing portion 52 of tubular mixer 20 where the reactants are intimately admixed and wherein the exothermic heat of solution of the sulfuric acid is sufficient, with the preheat of the reactant systems, to raise the reactants to an incipient reaction temperature.

The reactants are discharged through riser 54 into the upper portion of vessel 10 which is maintained partially filled with the reactants and which has a sufficient capacity to provide the desired residence time for substantially complete reaction. The reactants are maintained at superatmospheric pressure in vessel 10 by control valve 56 in vent line 58 which is controlled by pressure indicator controller 60 that is responsive to the measured pressure within the vessel 10. If desired, the steam released through valve 56 can be directed to slurry tank 34 to supply preheat to the reactants. A relief valve 62 of a reverse acting burst disk construction is provided and is set for relief of the pressure at the predetermined maximum design pressure of the reactor. The reaction pressure for a continuous process is preferably the autogenic pressure of the reactants. It is possible, however, to perform the reaction at greater pressure by delivering the reactants to autoclaves at superatmospheric pressure or by injecting steam into the reaction zone.

The reactants introduced into reactor 10 are maintained at the optimum reaction temperature which is maintained in the vessel by cooling of the reactants with tubular heat exchanger 44. Cooling water is passed into the heat exchanger 64 at a rate controlled by valve 66 that is under control of temperatures at a number of locations such as thermocouples 70 and 72. The heat exchanger 64 in vessel 10 is preferably a bundle of Teflon tubes available from E. I. DuPont de Nemours Company in preassembled units having a plurality of small diameter Teflon tubes, typically, of a diameter of about 0.05 to about 0.2 inch O.D. This preassembled bundle is suspended in the reactor with all or a portion of the bundle immersed in the liquid reactants. It is preferred to have a portion of the bundle in the vapor phase to insure adequate cooling of the vapor phase and more precise control of the reactor pressure.

The crude reaction product is withdrawn from vessel 10 through line 74 and passed into the upper portion of product cooler 30. The crude reaction product is diluted, if desired, with sufficient water to achieve the desired final product concentration by addition of water through line 76 at a rate controlled by valve 78 that is controlled by density indicator controller 80 which senses the hydrostatic pressure head of a column of the product in product cooler 30. While the density indicator controller 80 is shown on product cooler 30, it can also be located between nozzles 95 and 97 of reactor 10 to a more instantaneous density indication. Cooler 30 has an internal heat exchanger 82 that is supplied with cooling water through line 84 at a nominal rate, sufficient to reduce the temperature of the product to a satisfactory level for passage to storage tank 86 through product withdrawal line 88. The rate of product withdrawal is controlled by valve 90 which is controlled by level indicator controller 92 that maintains a predetermined liquid level within vessel 10 and has, for this purpose, a plurality of level indicators 94, 96 and 98 whereby the liquid level and, hence, residence time of the reactants in vessel 10 can be readily controlled.

As previously mentioned, the rate of addition of the alumina-containing solid to the process is controlled by the speed of drive motor 28 of screw conveyor 26. This motor is controlled by conductivity indicator controller 32 which responds to the sensed electrical conductivity of the reactants within vessel 10. The conductivity sensor, generally indicated at 100, is shown at an intermediate elevation within the reaction vessel 10. The meter could also be located near the exit of vessel 10 to sense the conductivity of the crude reaction product if desired. The conductivity meter that is used in the preferred embodiment is available from the Beckman Instrument Company, Fullerton, Calif., and is a magnetic inductance conductivity meter which has a sensing element having no electrode exposed to the corrosive reactants.

The water for the process is supplied from tank 102 to the fresh water header 104. Water from the heat exchangers is returned through recirculation line 106 to a suitable water cooler 108 that can be a heat exchanger, cooling tower or any conventional means for cooling of the return water. The water is returned to tank 102 through line 110. If desired, the heat of reaction from the process can be used to preheat the reactants by bypassing a portion of the water from heat exchanger 64 to the water supply line 36 to the slurry mixing tank 34. This bypass can be effected through bypass line 112 and associated valving. Additional preheat for the reactants can also be supplied through line 114 and its control valve that is connected to a source of available process steam to preheat the slurry in tank 34 to a desired preheat temperature in a manner described hereinafter.

Figure 2:
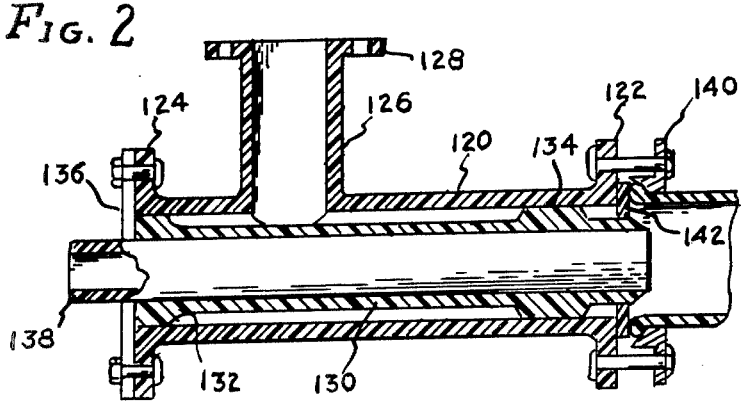
FIG. 2 illustrates the construction of the tubular reactant mixer employed in the invention.

Referring now to FIG. 2, there is illustrated a generally tubular mixer employed in the process. As illustrated, the mixer has a reactant introduction section 120 bearing end flanges 122 and 124 and a side nozzle 126 also bearing an end flange 128. The introduction section 120 is of fiberglass construction and bears a coaxial internal sleeve 130 having a base 132 for support on the interior wall of section 120 and a plurality of axial ribs 134 at its opposite end also for support of the tube 130. Flange 124 bears a closure plate 136 having a central bore through which extends tube 18 that extends into sleeve 130. The acid supply line 16 is attached to tube 18 to provide introduction of the sulfuric acid into the interior of the introduction section 120. The side outlet 126 is attached to the line 50 for the supply of the aqueous slurry of the alumina-containing solid which is passed as an annular stream about the sleeve 130. The blended streams are passed into the inlet of the tubular mixing section 52 that is secured to the end flange 122 of section 120 by a retainer ring 140 and sealed thereto by gasket or washer 142.

The tubular mixing section 52 is of a design and construction disclosed in U.S. Pat. No. 3,286,992 and contains a plurality of curved sheet elements such as 144 and 145 which are axially positioned along the length of the mixing section 52. The curved elements are formed of thin, flat sheet material having a width approximately equal to the diameter of the tube and a length from 1.25 to 1.5 times its width and twisted so that the upstream and downstream edges of each element are at a substantial angle to each other, e.g., at an included angle of from 60° to about 210°. As apparent from FIG. 2, the adjacent elements are twisted in opposite directions, e.g., element 144 having a left hand spiral and element 145 having a right hand spiral in the direction of flow. In the transit through the mixing section, the blended reactants from the introduction section 120 are caused to undergo a helical flow by curved elements such as 144. The direction of rotation of this helical flow is repeatedly reversed by the curved elements of opposite rotation such as 145 so that the reactants are intimately admixed within a very short travel of mixing section 52.

The alumina-containing solid that is employed in the reaction can, in general, by any solid material having an alumina content of at least about 35 weight percent and, preferably, having an alumina content from 35 to about 65 weight percent. A preferred material that can be used is bauxite having an alumina content of from 45 to 60 weight percent an an inert solids content from 3 to about 25 weight percent. In the preparation of iron-free aluminum sulfate, aluminum trihydrate, which contains about 65 weight percent of alumina, can be used for the reaction. Preferably, the alumina has a particle size less than ¼ inch in major dimension and, most preferably, passing approximately a 20 mesh screen with the weight majority of the particles passing about a 100 mesh screen. Very finely subdivided materials can be used but, generally, the solid need not be ground finer than that retained on about a 325 mesh screen.

The sulfuric acid that can be used for the reaction can be from about 30 to 99.4 weight percent sulfuric acid or fuming sulfuric acid (oleum) containing up to about 80 weight percent free sulfur trioxide. Generally, the acid will be diluted to approximately 30 to 60 weight percent in the reactor and, accordingly, acid of 30 weight percent or greater can be employed in the reaction. The concentration of the sulfuric acid supplied to the reaction depends on the process technique. If the alumina-containing solid is added as a solid to the reactor, all or any portion of the necessary water can be added with the sulfuric acid, e.g., sulfuric acid of a concentration as low as about 30 weight percent can be used. It is preferred, however, to employ concentrated sulfuric acid and use the heat of dilution of the acid as preheat for the reactants. Accordingly, sulfuric acid of a strength above about 60 weight percent is preferred. Concentrations of 70 to about 98 are preferred; and of 90 to about 99.4 weight percent are most preferred.

The reactants are heated sufficiently that upon admixture with the reacting mixture of alumina and sulfuric acid in the reaction zone they are heated to reaction temperature. Preferably, the reactants are preheated to an incipient reaction temperature of about 150° F., most preferably about 190° F., in the mixing zone and are introduced at that temperature to the reactor. If desired, greater heating of the reactants can be achieved in the mixing zone and the reaction can be initiated in the mixing zone to achieve a higher capacity or throughput of the plant. Preferably, however, the reaction is initiated in the reaction zone and no substantial amount occurs in the reactant mixing zone.

The reactants are maintained at a temperature of from 225° to about 260° F., preferably, from 230° to about 250° F. and, most preferably, about 235° to 245° F. in the reaction zone. As previously indicated, this temperature is maintained by control of the flow rate of cooling water through the heat exchanger of the reaction zone. The pressure on the reactants in the reaction zone is the autogenic pressure of the reactants from 15 to about 150 p.s.i.g., preferably from 15 to about 40 p.s.i.g. and, most preferably, about 35 p.s.i.g. The residence time of the reactants in the reaction zone is maintained from 5 to about 45 minutes, preferably, from 5 to about 15 minutes and, most preferably, from 7 to about 15 minutes, and sufficient to achieve from 78 to about 100, preferably, from 90 to about 100 percent completion of the reaction. The product removed from the reactor is diluted to provide a final product having a density from about 1.2 to about 1.4, preferably, about 1.25 to about 1.35 specific gravity.

The crude reaction product is cooled in the product cooler to a sufficient temperature for storage and handling, typically, to a temperature from 120° to about 190° F., preferably, about 170° F.

The following example will serve to illustrate a mode of practice of the invention and demonstrate results obtainable thereby.

EXAMPLE

A continuous process such as illustrated in FIG. 1 is operated for the production of about 33,000 weight parts of product per hour. Bauxite having a powder size passing a 20 and retained on a 325 mesh screen is supplied to the slurry mixing tank at a feed rate of about 5,000 parts per hour and is admixed with dilution water supplied at a rate of about 27 parts per minute. The resultant slurry is supplied to the reactant mixing zone at a rate of about 31 gallons per minute where it is blended with sulfuric acid of about 98 weight percent concentration that is supplied thereto at the rate of about 9 gallons per minute. The admixed reactants during steady state operation of the process have a temperature, resulting from the exothermic heat of solution of the sulfuric acid upon mixing, of about 190° F. At the start up of the process, steam is introduced into the slurry mixing tank to raise the temperature of the slurry to about 135° F. which is sufficient, with the heat of solution of the sulfuric acid, to heat the reactants upon mixing to a temperature of about 225° F. and thereby initiate the reaction.

The reactants are passed to the reaction zone that is maintained at a temperature of 245° F. by circulation of water through its internal heat exchanger. The reactor pressure is maintained at 30 p.s.i.g. and the product is withdrawn from the process at a rate sufficient to maintain a 10 minute residence time within the reactor. The crude reaction product withdrawn from the reactor is diluted with water to produce a final product having a density of 1.31, corresponding to about 11 pounds aluminum sulfate per gallon. The product is cooled to a temperature of 170° F. in the product cooler.

The equipment used in the process is constructed of suitable corrosion resistant material for handling of the highly corrosive sulfuric acid reactants and the product of the reaction. The tubular mixer of FIG. 2 can be constructed of Pyrex or fiberglass reinforced resins and the reactor vessel can be constructed of fiberglass reinforced resins with a Teflon heat exchanger bundle. The mixing section of the tubular mixer can be constructed of glass or, more preferably, is also constructed of fiberglass reinforced resin for greater structural strength.

The invention has been described with reference to the presently preferred mode of practice. It is not intended that the invention be unduly limited by the illustrated and presently preferred mode of practice. Instead, it is intended that the invention be defined by the reagents and steps, and their obvious equivalents, set forth in the following claims.

What is claimed is:

1. A process for the manufacture of aluminum sulfate by the reaction of reactants consisting essentially of sulfuric acid and alumina which comprises:
   (a) forming a slurry of alumina solids in water;
   (b) continuously mixing said slurry and sulfuric acid in substantially stoichiometric proportions in a tubular mixing zone, preheating the reactants therein to reaction temperature, and diverting said reactants into helical flow and repeatedly reversing the direction of rotation of helical flow during passage of said reactants through said tubular mixing zone;

(c) continuously passing the reacting mixture of alumina solids and acid from said tubular zone into a retention zone partially filled with a liquid phase of said mixture and a vapor phase;

(d) retaining said reacting mixture in said retention zone for sufficient time to achieve from 78 to 100 percent complete reaction;

(e) maintaining the reacting mixture under said vapor phase in said retention zone maintained at autogenic pressure from 15 to about 150 psig, and at a temperature from 225° to about 260° F. by indirect heat exchange cooling of said reactants and said vapor phase with cooling water; and (f) continuously withdrawing aluminum sulfate product from said liquid phase in said zone.

2. The process of claim 1 wherein said reacting mixture is retained in said retention zone for sufficient time to obtain from 90 to about 100 percent complete reaction.

3. The process of claim 1 including the step of cooling the crude reaction product to a temperature from 120° to about 190° F. without vapor separation therefrom to obtain an aqueous solution of aluminum sulfate.

4. The process of claim 3 including adding water to said crude reaction product to prepare an aqueous solution of aluminum sulfate of a preselected concentration and effecting density separation of unreacted alumina and inert solids from said crude reaction product stream.

* * * * *